United States Patent [19]

Gallagher

[11] 4,030,241
[45] June 21, 1977

[54] MULTIPLE PITCH ANIMAL CALL
[76] Inventor: H. Dan Gallagher, 902 SE. 119th, Vancouver, Wash. 98664
[22] Filed: Apr. 29, 1976
[21] Appl. No.: 681,413
[52] U.S. Cl. .................................... 46/180; 46/177
[51] Int. Cl.² ......................................... A63H 5/00
[58] Field of Search .................... 46/177, 178, 180
[56] References Cited
UNITED STATES PATENTS

| 2,182,692 | 12/1939 | Harbin | 46/180 |
| 2,470,823 | 5/1949 | Luch | 46/180 |
| 2,584,549 | 2/1952 | Carhart | 46/180 |

Primary Examiner—Louis G. Mancene
Assistant Examiner—Robert F. Cutting
Attorney, Agent, or Firm—Klarquist, Sparkman, Campbell, Leigh, Hall & Whinston

[57] ABSTRACT

A combination deer-predator call has a casing divided into upper and lower half sections held together by end caps. A pair of hinged flaps at opposite sides of the upper section form movable mouthpiece portions which define with adjacent lower casing portions mouthpiece openings which lead into an interior air space of the casing. Air blown through either opening passes across one of two elastic bands each stretched between an end portion of the casing and a corresponding slide positioner to produce an animal-like sound. The pitch of the sound produced by each band is varied by moving the associated slide positioner along a positioning slot in the casing to different retention slots. Each flap, when pressed inwardly, clamps its associated band in one of several variable stretched positions as determined by its slide positioner to produce a clear sound of the selected pitch. When released, the flaps enable the tension in the operative portions of the bands to be changed by the slide positioner. Each band is of a different size so as to have a different basic pitch than the other. The interior of each upper and lower half section of the casing is a complex arrangement of lands and relieved areas to provide the necessary airspace, guideways and clearances within the interior of the casing to enable the bands to produce the desired sounds.

15 Claims, 10 Drawing Figures

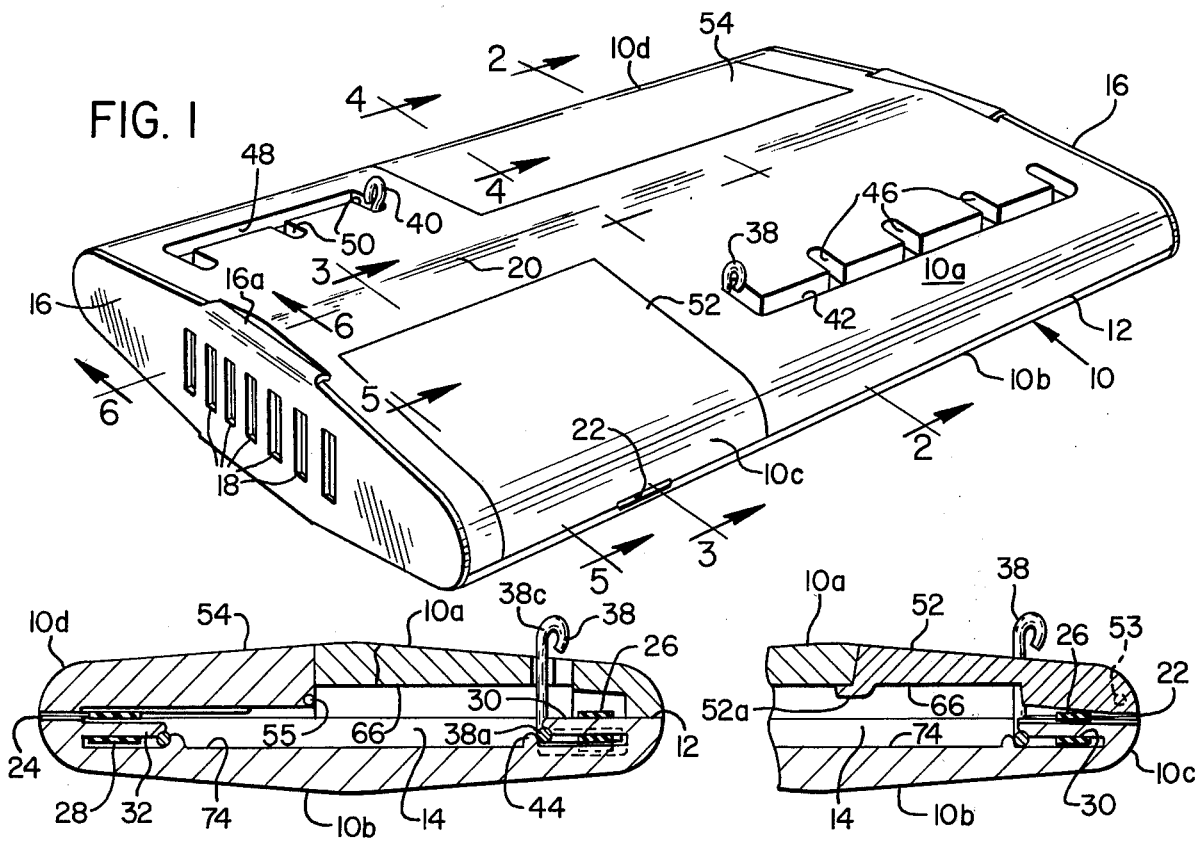
FIG. 1
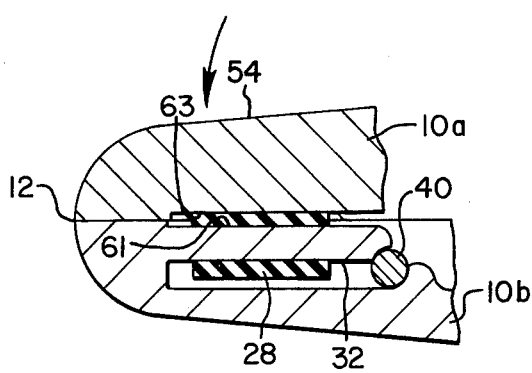
FIG. 2
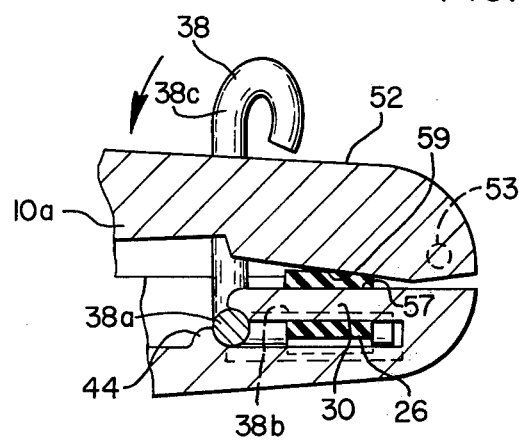
FIG. 3
FIG. 4
FIG. 5
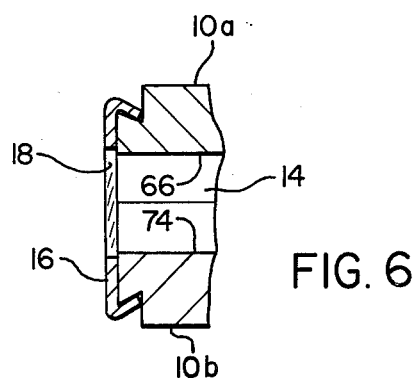
FIG. 6

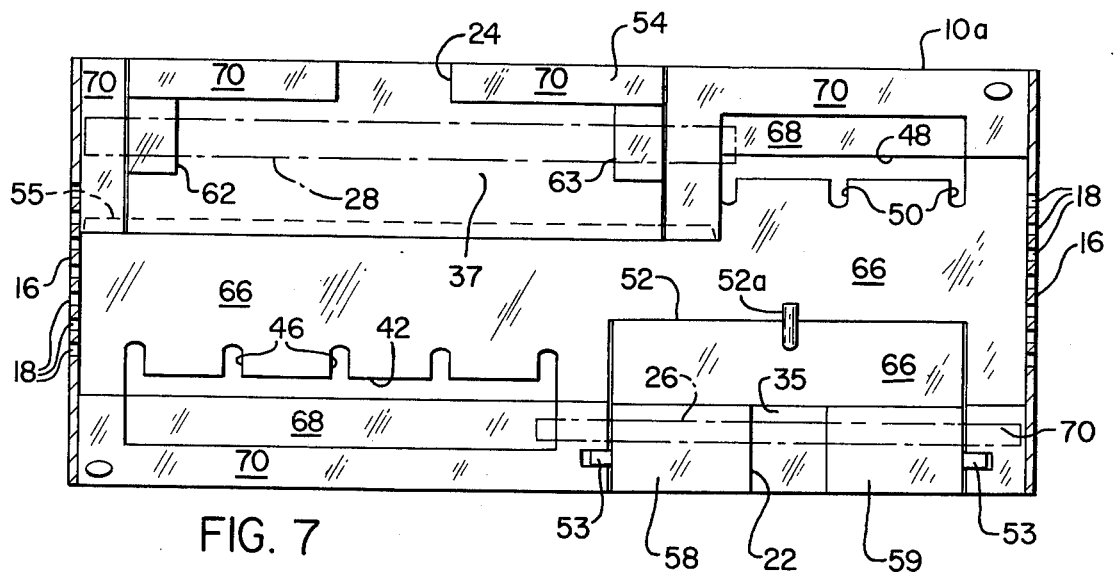
FIG. 7
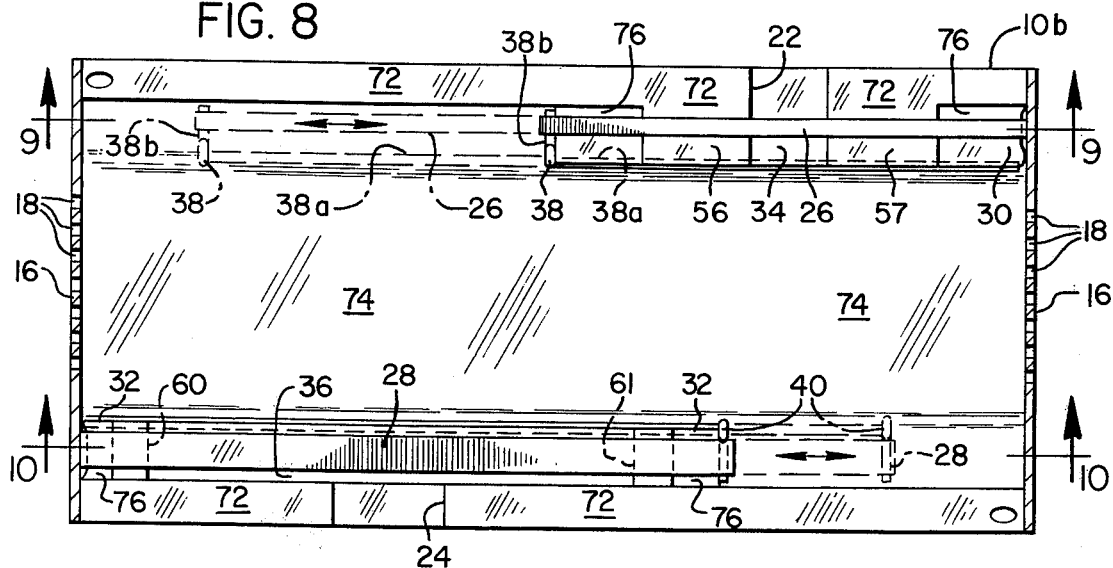
FIG. 8
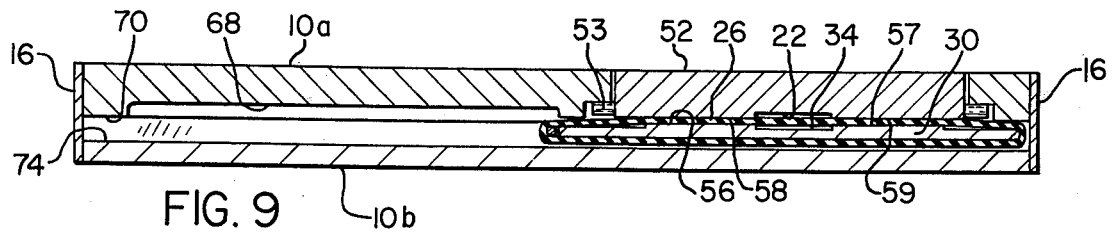
FIG. 9
FIG. 10

MULTIPLE PITCH ANIMAL CALL

BACKGROUND OF THE INVENTION

1. Field of the Invention

The present invention relates to an animal call and more particularly to an animal call capable of imitating the sounds of different animals and producing variable pitched sounds.

2. Description of the Prior Art

Various types of bird and animal calls have been devised. One common type utilizes a metal or plastic reed which is vibrated when air is blown across the reed. Various reed-type calls are manufactured and sold by, for example, Herter's, Inc., of Mitchell, S. Dak., and are illustrated in their various catalogs. Reed-type calls typically produce a harsh, unnatural sound. They also usually produce a loud sound which must be muffled to be effective, further distorting the sound. Reeds also sometimes crack in very cold weather.

Another common type of animal call is one utilizing an elastic rubber band stretched between two anchor points and across a mouthpiece opening through which air can be blown to vibrate the band and thus produce a sound. Many callers believe that rubber band, when stretched and vibrated, more closely simulates a vocal cord than does a metal or plastic reed, and thereby produces a more natural sound. Such elastic band-type calls are illustrated, for example, in Luch U.S. Pat. No. 2,470,823 and Carhart U.S. Pat. No. 2,584,549. The aforementioned Luch patent also suggests that mouthpieces of different sizes can be used with the elastic band to produce different sound pitches.

In elastic band-type calls, it has also been suggested that the tension in the elastic band can be varied to vary the pitch of the sound produced. A bird call using such a concept is disclosed, for example, in Harbin U.S. Pat. No. 2,182,692.

However, a limitation of most available bird and animal calls is that they are for the most part capable of producing only one basic sound pitch and suitable for calling only one species of animal or bird. Thus, if a hunter desires to hunt both ducks and geese using a call, he might have to carry both a duck call and a separate goose call and one could easily be mistaken for the other. Similarly, if a hunter desires to hunt, for example, both deer and various predators using a call, he would have to carry several different call devices. The aforementioned Herter's catalog, for example, advertises different call devices for different bird species including ducks, geese, pheasant, doves, crows and turkeys. The same catalog carries different call devices for calling racoons, squirrels, cottontail rabbits, elk, and several different call devices for calling deer. There are also different call devices carried in the same catalog for calling different predators such as foxes, wolves, bobcats, mountain lions, and bears.

Another disadvantage of many call devices, particularly those using a reed, is that they are incapable of producing even slight variations of pitch to reflect the fact that different animals within the same species have slightly different calls. Therefore the hunter of, for example, deer, may have to carry several different deer calls, each with a slight difference in pitch for satisfactory results.

Because of the multiplicity of different calls for calling different bird and animal species and even the same species, the serious hunter must acquire a bewildering number of different calls and take several of them with him on any given hunting expedition.

Accordingly, there is a need for a single call device capable of calling more than one species of animal or bird. There is also a need for a single call device having an easily variable pitch which can be varied both over a wide range for calling different species and within a narrow range for calling different animals of the same species.

SUMMARY OF THE INVENTION

The present invention provides an animal call capable of calling more than one species of animal, such as both deer and various predators. The multiple animal call of the invention also is capable of varying the sound pitch produced within a wide range so that the most effective pitch for calling a particular animal species can be selected. The call of the invention also provides for a slight variation of the sound pitch for calling animals of one species so that the most effective sound for a given species can be selected.

One feature of the invention is the use of multiple elastic bands in a single call device, each band for calling a different species or type of animal.

Another feature of the invention is the use of two elastic bands, each of a different size for producing two different basic sound pitches effective for calling different types of animals.

Another feature of the invention is the provision of an elastic band-stretching means for placing each band under a selectively variable tension for varying the sound pitch of the band.

Still another feature of the invention is the provision of means for selectively retaining each band in a preselected position of adjustment to produce a desired sound pitch.

Still another feature of the invention is the provision of a different mouthpiece opening for each band, with each opening sized so as to most effectively cooperate with the associated band in producing the desired sound.

Yet another feature is the provision of a sound control flap means for each band which enables the free stretching movement of the band and yet when pressed inwardly clamps the band under a preselected tension to produce a clear sound of the desired pitch. The sound control flap for each band also is effective to vary the effective size of the mouthpiece opening associated with each band to further control to some extent the quality and pitch of sound produced.

In an illustrated embodiment of the invention, a call device has both a "predator side" and a "deer side." The predator side can be used to simulate the death cry or distress call of many small animals such as a bobcat or wildcat kitten, a raccoon, a jackrabbit or cottontail rabbit, or a field mouse. These sounds attract predators such as the wolf, fox, coyote, bobcat, cougar, lynx, wolverine, bear and wild boar. Eagles and hawks can also be attracted by such sounds, as can the curious deer. The deer side of the call is designed to simulate several different sounds that are sometimes made by deer, so as to attract other deer.

Primary objects of the invention are to provide a call which is:

a. capable of imitating the calls of and calling different species of animals or birds;

b. capable of imitating the calls of and calling different birds or animals within the same species;
c. capable of varying the pitch of sound produced within a wide range of pitches to imitate the calls of different species and within a narrow range to imitate the varying calls of different animals within the same species;
d. easy to operate;
e. compact so as to be easily carried; and
f. easy to maintain at a selected sound pitch, for each animal or bird desired to be called.

The foregoing objects, features and advantages of the present invention will become more apparent from the following detailed description which proceeds with reference to the accompanying drawings.

BRIEF DESCRIPTION OF THE DRAWINGS

In the drawings:

FIG. 1 is a perspective view of a call in accordance with the invention as viewed toward one end and an upper side of the call;

FIG. 2 is a sectional view taken along the lines 2—2 of FIG. 1;

FIG. 3 is a partial sectional view taken along the line 3—3 of FIG. 1;

FIG. 4 is a partial sectional view on an enlarged scale taken along the line 4—4 of FIG. 1;

FIG. 5 is a partial sectional view on the same scale as FIG. 4 taken along the line 5—5 of FIG. 1;

FIG. 6 is a partial sectional view taken along the line 6—6 of FIG. 1;

FIG. 7 is an interior plan view of the upper one-half section of the call of FIG. 1;

FIG. 8 is an interior plan view of the lower one-half section of the call of FIG. 1;

FIG. 9 is a sectional view taken along the line 9—9 of FIG. 8; and

FIG. 10 is a sectional view taken along the line 10—10 of FIG. 8.

DETAILED DESCRIPTION OF A PREFERRED EMBODIMENT

With reference to FIG. 1, the animal call of the invention comprises a casing 10 divided into two sections along a parting line 12 including an upper section 10a, and a lower section 10b. The two casing sections together define an interior air space 14 as shown best in FIG. 2. The casing sections are held together by removable end caps 16 which close the opposite ends of the interior space 14 and which clip into place on the casing sections by means of clip portions 16a of such caps. Each end cap is provided with air vent slots 18 to permit the escape of air and thus sound from the interior of the casing to produce a suitable volume of sound. The casing sections can be made, for example, of wood or molded plastic material. The end caps can be formed of a spring metal or plastic material.

The casing is tapered from its longitudinal median plane, represented by the line 20 in FIG. 1, along its upper and lower outer surfaces inwardly to rounded opposite side edge portions in the region of parting line 12. Opposite side edge portions 10c and 10d near opposite end portions of the casing define a pair of mouthpiece means providing mouthpiece opening means 22, 24 at the parting line 12. Such mouthpiece openings lead through the casing into communication with the interior air space 14. Mouthpiece opening 22 is shown best in FIGS. 1, 3, 7, 8 and 9, whereas mouthpiece opening 24 is shown best in FIGS. 2, 7 and 8.

Referring especially to FIGS. 2, 3 and 8, two elastic bands 26, 28 are positioned within the casing, one on each of the opposite sides of the casing and offset toward opposite end portions of the casing. Each band is an endless rubber band looped over positioning means comprising tongue portions 30, 32. These tongue portions are integral inward extensions of longitudinal side edge portions of lower casing section 10b. Each tongue portion is positioned so as to stretch an upper length of each band across a path of air blown into the interior of the casing through mouthpiece openings 22 and 24. More specifically, as shown in FIGS. 2 and 3, the upper lengths of the two bands 26, 28 lie edgewise in a stream of air blown into the interior of the casing through the mothpiece openings 22, 24, respectively.

The upper surfaces of tongue portions 30, 32 and the opposed inner surfaces of upper casing section 10a in the regions 34, 36 (FIG. 8) and 35, 37 (FIG. 7) of the mouthpiece openings are relieved. The upper lengths of bands 26, 28 span these relieved areas and are thus free to vibrate and thereby produce sound when a stream of air is blown into the casing through the respective mouthpiece openings 22, 24.

Each elastic band 26, 28 is stretchable to different degrees of tenion to produce different sound pitches by a separate band-stretching means. The band-stretching means includes a slide positioner 38 for the band 26, shown best in FIGS. 2 and 8, and a similar slide positioner 40 for the band 28, shown best in FIGS. 8 and 10. Slide positioner 38 is a stiff metal wire member having a long longitudinally extending slide portion 38a, a short laterally extending band-holding portion 38b extending through the loop at one end of band 26 and a slide actuator portion 38c at the intersection of portions 38a and 38b. Actuator portion 38c extends upwardly through a longitudinally extending positioning slot 42 in upper casing section 10a. Slide portion 38a, as shown best in FIGS. 2 and 5, is retained and slidable along a guideway within the casing formed by a free end portion of tongue extension 30 and a ridge 44 extending upwardly from the lower inner surface of lower casing section 10b.

When actuator portion 38c is moved along positioning slot 42, slide portion 38a slides within the aforementioned guideway, and band-holding portion 38b stretches the band 26 accordingly, varying its tension and the sound pitch it will produce. Positioning slot 42 is intersected at intervals along its length by a series of retention slots 46 for retaining the slide positioner 38 in various selected positions of adjustment and thus retaining the corresponding band 26 under different selected degrees of tension.

Slide positioner 40 for band 28 is similar in construction and function to slide positioner 38 and therefore will not be described in detail. Its actuator portion extends upwardly through a positioning slot 48 in upper casing section 10a on the opposite side and near an opposite end of the casing from positioning slot 42. Positioning slot 48 is intersected by, in this instance, only three retention slots 50 rather than the five indexing slots 46 for the band 26, although the number of retention slots provided is a matter of choice and may be varied.

By moving either slide positioner independently of the other to various positions of adjustment as determined by its retention slots, each band is stretched independently of the other to different degrees of tension to produce different sound pitches.

Referring back to FIG. 1, upper casing section 10a has a pair of movable flap means including the sound control flap 52 forming part of the mouthpiece portion 10c and sound control flap 54 forming part of the mouthpiece portion 10d. As shown in FIGS. 2 and 3, each control flap 52, 54 is hinged for inward or downward movement toward the opposed mouthpiece portion of lower casing section 10b.

Control flap 52 is hinged at 53 to the adjacent stationary portions of the upper casing section at its opposite ends for downward movement in the manner shown in FIG. 5 when pressed inwardly of the casing. The opposite flap 54 is hinged along a lower innermost edge thereof at 55 to adjacent stationary upper casing portions to provide only a limited degree of movement of the outermost portions of the flap. Inner surface portions of both flap 52 and 54 engage their associated bands 26 and 28 when pressed inwardly. Thus when downward pressure on the flaps is released, the springlike action of the bands returns the flaps to their normal outwardly relaxed positions as shown in FIGS. 2 and 3. A stop projection 52a is provided at a lower innermost corner of flap 52 so as to overlap the adjacent stationary portion of upper casing section 10a. When flap 52 springs upwardly under the influence of band 26, projection 52a limits the upward travel of such flap.

The primary purpose of flaps 52 and 54 is to enable free stretching movement of their respective elastic bands under the influence of slide positioners 38, 40 when the flaps are in their outer, relaxed positions. However, the interior surface of each flap 52, 54 is contoured so that when it is pressed inwardly, it clamps the upper length of its band against opposed interior surfaces of the lower casing section on opposite sides of the associated mouthpiece opening so that a clear sound is produced when a stream of air is blown through such opening. Thus the flaps provide a creative solution to the problem of producing a clear sound of varying pitch through a variable tensioning of the band.

The sound control flaps 52, 54 also have secondary functions. By varying the pressure applied to each flap, the effective size of its mouthpiece opening is varied slightly, and this in turn varies slightly the selected pitch of the sound. To a limited extent, the volume of sound can also be varied in this manner. Thus slide positioners 38, 40 serve as sound pitch selectors for the two bands and are capable of varying the pitch within a wide range by varying the tension of the band to a wide extent. The flaps, however, serve as sound control means to control the quality and pitch and to some extent the volume of sound within a narrow range.

The bands 26 and 28 are of different basic sizes. Band 26 is substantially shorter and narrower than band 28. This provides the two bands with different basic or nominal pitches, with the smaller band providing a considerably higher basic pitch than the larger band. The sizes of the bands are selected so as to produce a basic pitch that will simulate the sound of the animal or bird desired to be imitated.

For example, in a first working prototype of the invention, a large No. 62 elastic band having a nominal width of about 6 mm. and a nominal length of about 74 mm. was selected for band 28 to provide a deer call. A much smaller No. 30 elastic band having a nominal width of about 3 mm. and a nominal length of about 56 mm. was selected for band 26 to provide a predator call. The predator call is designed to imitate the sounds of small animals such as rabbits or mice, particularly such animals when in distress, to attract predators such as the fox, coyote, and members of the cat family. Thus in the original prototype described, with reference to FIG. 1 of the drawing, the side of the casing containing sound control flap 52 and slide positioner 38 became the "predator side", and the opposite side of the casing became the "deer side". These sides can be marked accordingly so that the user would have no difficulty in selecting the side of the device desired to call a particular animal.

The topography of the interior surfaces of the lower and upper sections of the casing will now be discussed in greater detail with reference to FIGS. 7–10. Referring first to FIG. 8, it was mentioned that band 26 in the area of mouthpiece opening 22 extends across a relieved extension 34 of such opening to vibrate freely when air is blown through such opening. There are raised portions or lands 56, 57 on opposite sides of recess 34 which engage an undersurface of the upper length of band 26.

Referring to FIG. 7, flap 52 has a corresponding recess 35 across which band 26 extends in the area of mouthpiece opening 22. Recess 35 overlies recess 34 of the lower casing section when the two sections are assembled together. Similarly the interior surface of flap 52 has lands 58, 59 on opposite sides of recess 35 which overlie lands 56 and 57 of the lower casing section when the two sections are assembled. Thus as shown in FIG. 5, when flap 52 is pressed inwardly toward the opposed lower casing section, interior lands 58, 59 of the flap and the opposed lands 56, 57 of the lower casing section coact to clamp the front edge of the upper length of band 26 on opposite sides of mouthpiece openings 22 and inward continuations thereof defined by recesses 34 and 35 so that a clear sound is produced when air is blown through mouthpiece opening 22. The lands and recesses described in FIGS. 7 and 8 can also be seen in FIG. 9 where the upper and lower casing sections are assembled.

Similarly, band 28 extends across lands 60, 61 on opposite sides of recess 36 as shown in FIGS. 8 and 10. However, recess 36 for band 28, although corresponding to recess 34 for band 26, is much longer than recess 34. The length of such recess between lands also affects the control of sound produced by the band when air is blown across its thin edge. Also in the illustrated embodiment, designed for a combination deer and predator call, recess 36 is deeper with respect to the elevation of lands 60, 61 than is recess 24 forming a portion of the associated mouth opening. Again, however, this is a matter of design for a particular basic sound pitch desired.

Referring to FIG. 7 flap 54 overlying lands 60, 61 of FIG. 8 has a recess 37 which overlies recess 36 of the lower casing section when the upper and lower sections are assembled. Recess 37 forms an inner continuation of mouthpiece opening 24 in the flap but widens out considerably from the mouthpiece opening. The interior surfaces of flap 54 also include lands 62, 63 on opposite sides of recess 37. These lands overlie lands 60, 61 of the lower casing section when the upper and lower casing sections are assembled.

The upper length of band 28 extends across lands 60, 62 on one side of recesses 36, 37 and across lands 61, 63 on the opposite side of such recesses. Such band becomes firmly clamped between such coacting opposed lands when external pressure is applied to flap 54 so that a clear sound is produced when air is blown through mouthpiece opening 24. This clamping action is shown in FIG. 4 with respect to opposed lands 61 and 63. Lands 61 and 63, like lands 62 and 64, lie generally parallel to one another so that when flap 54 is pressed downwardly, lands 61, 63 clamp the upper length of band 28 evenly across its full width to produce a desired sound.

In contrast, the beveled surfaces of lands 58, 59 of flap 52, as shown in FIG. 5, clamp the upper length of band 26 only along its outermost edge, leaving the inner edge free to vibrate. Through experimentation it was found that this produces a sound of the desired pitch and quality for a predator call given the particular size of band selected and other characteristics of the described prototype. However, if other than a predator call is desired for this side of the device, or if a different size of band is used, it may be desirable to clamp band 26 across its entire width in the same manner as band 28. In such case opposed lands 57, 59 should be contoured so as to lie parallel to one another and flap 52 should be hinged like flap 54 to provide the desired full width clamping of band 26.

The foregoing illustrates that the hinging action of the flaps and the contours of the opposed lands can be modified so as to produce a desired basic sound suitable for a particular animal call desired. In any case, however, both flaps operate so that when not under pressure, they permit the free stretching movement of their associated bands and so that when pressed inwardly they clamp portions of their bands on opposite sides of the mouthpiece opening to produce a desired sound.

Referring to the interior surfaces of the upper casing section of FIG. 7, the reference numerals 70 refer to surfaces of approximately equal elevation and approximately the same height above the lowest interior surface areas 66 of the casing, also of about equal elevation. Reference numerals 68 refer to all surfaces of equal elevation which are slightly relieved below the highest surface portions 70 but above the elevation of areas 66. Actually the lands 62 and 63 are slightly lower than surfaces 70, but higher than surfaces 68. The lands 58, 59 of flap 52 are slightly below the elevation of highest surfaces 70, but higher than recessed surface 35 and recessed surfaces 68 and 66.

Referring to the interior surfaces of the lower casing of FIG. 8, reference numeral 72 represents the surfaces of equal and highest elevation. These include the lands 56, 57, but not lands 60, 61 which are slightly lower in elevation than surfaces 72. Reference numeral 74 represents the surfaces of equal and lowest elevation in the lower casing section. This includes most of the interior surface area of the lower casing except the side edge portions. Surface portions 76 are at equal elevation and slightly below the elevation of the adjacent lands 56, 57 and highest surfaces 72. Recessed surface portion 36 across which band 28 is stretched is slightly lower in elevation than lands 60, 61, but is considerably higher in elevation than the lowest surface areas 74.

OPERATION

In FIG. 1 the casing is shown in its operative position with the upper and lower casing sections in mating relationship and held together by the clip portions of end caps 16. Elastic bands 26, 28 are positioned as shown in FIGS. 2 and 3 within the casing with the size of the bands selected so that band 26 produces a predator call and band 28 produces a deer call when air is blown through their respective mouthpiece openings 22, 24.

The pitch selecting slide positioners 38, 40 extend upwardly through the casing into their respective positioning slots 42, 48. Assuming the operator wishes to call a predator, he holds the casing, sized to fit comfortably within the palm of his hand, with mouthpiece opening 22 toward him. His mouth is placed over mouthpiece opening 22 and on the mouthpiece edge portion 10c of the casing. While blowing air into the interior of the casing through mouthpiece opening 22, he moves pitch selector 38 along positioning slot 42 until the desired sound pitch is produced. At this point selector 38 is inserted into the closest retention 46. Thereafter, each time the user blows through the mouthpiece opening 22, the same pitch sound is produced.

As the caller blows through mouthpiece opening 22, he presses down on flap 52, clamping band 26 as shown in FIG. 5 to produce the desired sound. The pressure on flap 52 may be varied to vary slightly the pitch of the selected sound. If desired, the caller may move the pitch selector 38 along slot 42 while producing sound by blowing through mouthpiece opening 22 to vary the sound pitch during a given call, or he may maintain the pitch selector 38 in one of retention slots 46 to produce a relatively constant pitch sound during any given call.

In the specific embodiment previously described, the lowest pitch sound produced by band 26 with the pitch selector in the retention slot shown in FIG. 1 closely simulates the sound of a raccoon or of wildcat or bobcat kittens. Moving along the positioning slot, the selector when inserted in the next retention slot, simulates the sound of a dying rabbit. When the selector is inserted in the retention slot at the opposite end of positioning slot 42, selector 38 produces a high-pitched, shrill sound closely simulating that of a field mouse or other rodent in distress. Variations of these sounds are produced by inserting the pitch selector in the other intermediate retention slots.

To call deer the caller simply reverses the casing in his hand to place his mouth over mouthpiece opening 24. He blows through such opening while moving pitch selector 40 along positioning slot 48 to the desired retention slot 50 to produce the desired sound pitch. He also presses on flap 54 while blowing. The deer side of the casing has three different retention slots. Each when selected produces a slightly different, relatively low-pitched sound, simulating the call of a deer. Thus the deer side recognizes that animals of one species do have different calls at different pitches. Thus under differing conditions or in different areas, one retention slot might be more effective than another.

The casing can easily be disassembled when needed, for cleaning or replacement of bands, simply by removing end caps 16 and separating the upper and lower casing sections. If desired, different-sized bands may be substituted for the initial bands of the device to produce different pitched sounds to call different animals or birds It will be appreciated that both the size of the casing and the size of the bands may vary, as well as the topography of the inner surfaces of both casing sections to vary the sound produced in accordance with that desired.

Having described the principles of my invention in terms of one specific preferred embodiment, it will be apparent to those skilled in the art that such embodiment may be modified in arrangement and detail without departing from such principles. I claim as my invention all such modifications as come within the true spirit and scope of the following claims.

I claim:

1. A multiple pitch animal call comprising:
a casing defining a mouthpiece means having exterior mouthpiece opening means leading into an interior air space within said casing,
at least two stretchable elastic bands within said casing,
band-positioning means within said casing positioning an edge portion of each said band inwardly of said mouthpiece opening means so that when a stream of air is blown into said interior space through said mouthpiece opening means it vibrates one or the other of said bands and thereby produces a sound,
and band-stretching means for each band movably mounted within said casing and operable from the exterior of said casing for variably stretching each band independently of the other band so that each band can produce sounds of variable pitch.

2. A device according to claim 1 wherein each band is of a different nominal size than the other so as to produce a sound of a different basic pitch than the other.

3. A device according to claim 1 wherein said band-stretching means for each band comprises a slide positioner engaging said band and extending outwardly through a positioning slot in said casing along which said slide positioner is slidable to stretch an associated band, said positioning slot being intersected at intervals along its length by retention slots operable to retain said slide positioner and thereby maintain said band selectively in different stretched positions to produce different-pitched sounds.

4. A device according to claim 1 wherein said mouthpiece means includes a different mouthpiece and said mouthpiece opening means comprises a different mouthpiece opening for each band so that each band is activated by a different airstream.

5. A device according to claim 4 wherein said mouthpiece opening for one band is positioned on an opposite side of and near an opposite end portion of said casing from the mouthpiece opening for the other band, and the corresponding band for each mouthpiece opening is positioned within said casing at the same side and near the same end portion of said casing as its corresponding mouthpiece opening.

6. A device according to claim 4 wherein each mouthpiece opening is of a different size than the other mouthpiece opening.

7. A device according to claim 6 wherein the larger of said mouthpiece openings cooperates with a larger one of said bands.

8. A device according to claim 4 wherein each said mouthpiece opening is of a variable effective size.

9. A device according to claim 8 wherein the effective size of each mouthpiece opening is variable by a flap means forming a portion of the associated mouthpiece and defining a portion of the associated mouthpiece opening, said flap means comprising a movable portion of said casing and being movable toward and away from an opposed stationary portion of said casing.

10. A device according to claim 9 wherein there is a separate said flap means for each said mouthpiece opening.

11. A device according to claim 10 wherein at least one of said flap means is hinged for movement to vary the effective size of the associated mouthpiece opening.

12. A device according to claim 1 including flap means forming a movable mouthpiece portion of said casing and defining a portion of said mouthpiece opening means, said flap means normally operable in a relaxed condition to enable free stretching movement of said bands by said stretching means and being operable when pressed toward an opposed stationary portion of said casing to clamp said bands on opposite sides of said mouthpiece opening means to produce a clear sound.

13. A device according to claim 12 wherein raised inner surface portions of said flap means cooperate with raised inner surface portions of said opposed stationary portion of said casing to clamp said bands therebetween on opposite sides of said mouthpiece opening means upon pressing movement of said flap means toward said opposed stationary casing portion.

14. A device according to claim 12 wherein said flap means includes a separate flap means for each band and wherein said mouthpiece means and said mouthpiece opening means comprise a separate mouthpiece and separate mouthpiece opening for each band, the flap means for one said band cooperating with an opposed stationary casing portion to clamp only one of the two opposite edges of said one band upon movement of the associated flap means toward the cooperative opposed stationary casing portion.

15. An animal call comprising:
a casing defining a mouthpiece means with an exterior mouthpiece opening means leading through said casing into an interior air space within said casing,
stretchable elastic band means positioned within said casing so as to extend edgewise through a stream of air produced within said interior space by blowing air into said casing through said mouthpiece opening means,
band-stretching means movably mounted in said casing and operable from the exterior of said casing for stretching said band means to vary the pitch of sound produced thereby when subjected to said stream of air,
and flap means forming a movable mouthpiece portion of said casing and defining a portion of said mouthpiece opening means, said flap means being cooperable with an opposed stationary portion of said casing to enable free stretching movement of said band means during the absence of external pressure on said flap means and to clamp said band means on opposite sides of said opening means upon the application of external pressure to said flap means to enable said band means to produce a clear sound.

* * * * *

UNITED STATES PATENT OFFICE
CERTIFICATE OF CORRECTION

PATENT NO. : 4,030,241
DATED : June 21, 1977
INVENTOR(S) : H. Dan Gallagher

It is certified that error appears in the above-identified patent and that said Letters Patent are hereby corrected as shown below:

Column 4, line 17, "mothpiece" should be --mouthpiece--;
Column 8, line 17, after "retention" insert --slot--;
Claim 12, column 10, line 14, after "normally" insert --being--.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*